United States Patent
Shortway et al.

[15] 3,660,187
[45] May 2, 1972

[54] WEAR RESISTANT, TEXTURED RESINOUS COMPOSITIONS

[72] Inventors: Harry A. Shortway, Glen Rock; Alan A. Graham, Mercerville; Robert D. Mansolillo, Bloomfield, all of N.J.; Joseph F. Dobry, Langhorne Manor, Pa.

[73] Assignee: Congoleum Industries, Inc., Kearney, N.J.

[22] Filed: Mar. 14, 1969

[21] Appl. No.: 807,269

[52] U.S. Cl. ................................156/79, 264/48, 264/54, 156/277
[51] Int. Cl. ..........................................B32b 5/18
[58] Field of Search ..................156/54, 78, 79, 277; 264/48

[56] References Cited

UNITED STATES PATENTS

| | | | |
|---|---|---|---|
| 3,293,094 | 12/1966 | Nairn et al. | 156/79 |
| 3,365,353 | 1/1968 | Witman | 156/79 X |
| 3,373,072 | 3/1968 | Jones | 156/79 X |
| 3,458,337 | 7/1969 | Rugg | 156/79 X |

Primary Examiner—Benjamin R. Padgett
Assistant Examiner—S. R. Hellman
Attorney—Richard T. Laughlin

[57] ABSTRACT

Wear resistant resinous compositions having textured or embossed surfaces resulting from the process which comprises selectively contacting a resinous polymer containing a blowing agent dispersed therein with an inhibitor for said agent, applying thereto a self-supporting layer of a translucent, decorative, resinous wear layer, and, thereafter heating the resulting assembly so as to effect the decomposition of the blowing agent and the resultant expansion on the surface of the resinous composition as well as to fuse the wear layer which has conformed to the surface embossings.

20 Claims, 2 Drawing Figures

INVENTORS
HARRY A. SHORTWAY
ALAN A. GRAHAM
ROBERT D. MANSOLILLO
JOSEPH F. DOBRY

BY Richard T. Laughlin

ATTORNEY

WEAR RESISTANT, TEXTURED RESINOUS COMPOSITIONS

BACKGROUND OF THE INVENTION

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added decorative appeal and, in many instances, further utility. Typical of the types of embossings are those which simulate leather or textured cloth, such as linen. In some instances, the embossed areas are filled in with pigmented ink by techniques known as "spanishing" or "valley printing."

The introduction of cellular resinous compositions has led to their incorporation in products such as recited above, either alone, or in combination with non-cellular resinous composition surface wear layers and/or backing webs. The cellular foam sheet gives the product various desirable properties, depending on the type of cellular foam, such as high resiliency and good feel or "hand."

Embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Various methods have been suggested for producing cellular foam products having a textured or embossed surface without utilizing embossing rolls. Embossing rolls are expensive to produce and when combined with a valley printing operation are difficult to control. In some instances, it is desired to print a design and then emboss in register with the design. Such an operation requires very complex equipment. Additionally, embossing of curved or irregular surfaces is very difficult.

One method which eliminates embossing rolls is disclosed in U.S. Pat. No. 2,961,332 which issued to R. Frank Nairn on Nov. 22, 1960. In accordance with this patent, a layer of foamable resinous composition is formed on a base by printing a number of different resinous compositions each containing its own amount or type of blowing agent. The layer is then heated to decompose the blowing agent and fuse the composition. The product has an irregular or textured surface conforming to the amount or type of blowing agent in the various printed compositions. Another method is disclosed in U.S. Pat. No. 2,964,799 which issued to P. E. Roggi et al., on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. U.S. Pat. No. 2,825,282 which issued to J.B. Gergen et al., on Mar. 4, 1958, discloses a related method for producing a letterpress makeready. In accordance with this latter patent, a foamable composition is formed into a sheet and then printed with inks containing radiant energy-absorbing pigments. On exposure of the sheet to radiant energy, the blowing agent in contact with the pigments receives more intense heat and, therefore, will decompose and form cellular foam without affecting the unprinted portions of the sheet. As is apparent, the heating must be very rapid and carefully controlled.

An embossing technique which has become known as chemical embossing has proven to be a vast improvement over the procedures of the prior art is disclosed in U.S. Pat. Nos. 3,293,094 and 3,093,108, which issued to R. Frank Nairn et al on Dec. 20, 1966. In this procedure, the decomposition temperature of a chemical blowing agent dispersed in a resinous polymer composition is controlled by applying an inhibitor to the surface of the composition. The subsequent application of heat selectively decomposes the blowing agent, thereby resulting in the formation of either depressed or raised areas in the final product at the points of inhibitor application.

In many instances, the embossed products have been coated with a transparent protective layer which serves to provide wear resistance, resistance to attack by household chemicals, resiliency and stain resistance, etc. Although most prior art wear layers have performed satisfactorily, certain disadvantages have been inherent in their use when their thickness has exceeded about 0.014 inch. Thus, the fluidity of typical wear layer compositions of such thickness, at processing temperatures, has caused the wear layer composition to flow into and partially fill the depressed areas developed in the chemically embossed products. As a result, substantial reduction in the fluidity and depth of embossing has occurred. Although it would be expected that calendered wear layers containing fillers which can be laminated to the foamable gel would overcome this problem, such calendered sheets exhibit excessive resistance or "spine" and, therefore, are unable to readily conform to the embossings and in many instances bridge the depressed (embossed) areas. In order to compensate for this excessive resistance, lower gauge wear layers have necessarily been utilized, thus severely restricting the applicability of the final product in areas of heavy use where stronger, more resistant wear layers are required.

Higher plasticizer concentrations which seek to improve the flexibility and fluidity of such wear layers have adversely effected the hand or feel of the final product as well as the stain resistance of the wear layer. In addition, most of the plastisol compositions which have been utilized as wear layers have been transparent. The transparency enables the printed design below the surface of the wear layer to be observed and thus compensates for the reduced definition of the embossed areas. However, by magnifying the printed appearance, the transparent areas minimize the continuous, natural geometric appearance which is desired in the final product.

SUMMARY OF THE INVENTION

The primary object of this invention is to provide an embossed surface covering of novel construction. Another object is to provide a wear layer for such a covering which provides excellent performance and decorative characteristics while substantially overcoming the disadvantages present in the prior art wear layer compositions. A further object is to maintain, in these novel products, the advantages which are derived from chemical embossing techniques. Various other objects, and advantages of this invention will be apparent from the following detailed description thereof.

It has now been discovered that it is possible to produce superior resinous cellular foam products having embossed surfaces by contacting the surface of a resinous polymer containing a heat decomposable blowing agent dispersed therein with an inhibitor for said blowing agent, applying thereto a coating of a translucent, decorative, resinous wear layer, at least about 0.014 inch in thickness, as hereinafter described, and thereafter applying heat to the assembly in order to effect the decomposition of the blowing agent and the resultant expansion on the surface of the resinous composition as well as to fuse the protective wear layer.

It is to be noted that the resulting products combine the advantages typically derived from a chemical embossing technique with the unique performance characteristics exhibited by the specified wear layer compositions. Thus, this discovery makes possible the production of a product having embossed surfaces which can be in complete register with a printed design. Additionally, the discovery makes possible the utilization of any type of printing apparatus as an embosser, thereby eliminating the need for expensive embossing rolls and related equipment. Further, it allows the embossing of a surface without exerting pressure on the surface and without regard to the shape or contour of the surface.

The unique wear layers which are applied to these products exhibit superior wear resistance, resistance to attack by household chemicals, resiliency and stain resistance. Of great importance, these wear layers are sufficiently fluid at the temperatures utilized to decompose the blowing system so as to enable them to readily flow and conform to the embossings which subsequently develop. As a result, such wear layers are capable of being applied in heavier thicknesses than conventional plastisol wear layers, thereby providing additional protection in heavy duty application areas. They provide increased definition of the embossed regions when compared with conventional products at comparable wear layer thicknesses. They exhibit better hand and improved stain resistance as a result of the low plasticizer concentrations which may be utilized in their formulation. The translucency of these wear layers enables them to mask the printed look of the embossed product while still exhibiting the desired textured appearance. Furthermore, these wear layers may exhibit a large variety of decorative effects.

The number of products which can be produced by the process of this invention is unlimited. These products can be used in floor, wall, table and countertop coverings, and the like and, in fact, wherever resinous plastic sheets or compositions exhibiting surface wear resistance are required. Many additional applications of this invention will occur to those skilled in the art.

Our invention will be better understood from the following detailed description thereof together with the accompanying self-explanatory drawings in which:

FIG. 1 is a flow diagram of a typical embodiment of the process of this invention, and FIG. 2 is an enlarged cross-sectional view of the final embossed product.

DESCRIPTION OF THE PREFERRED EMBODIMENTS

Figure 1:
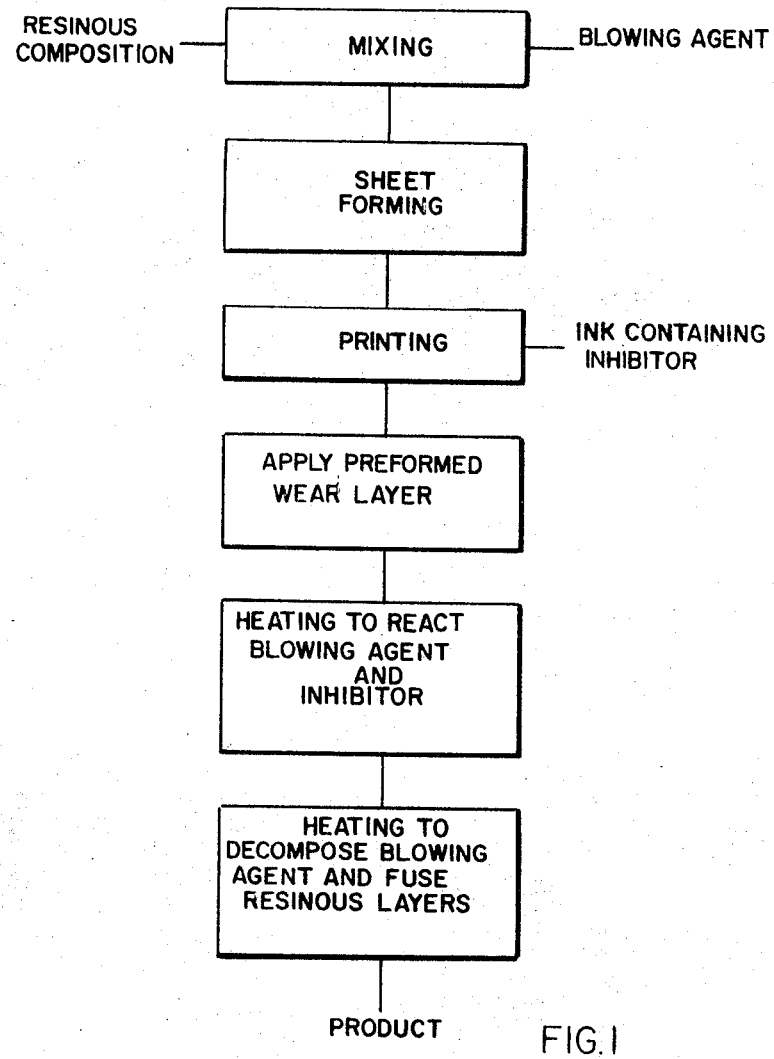
Figure 2:
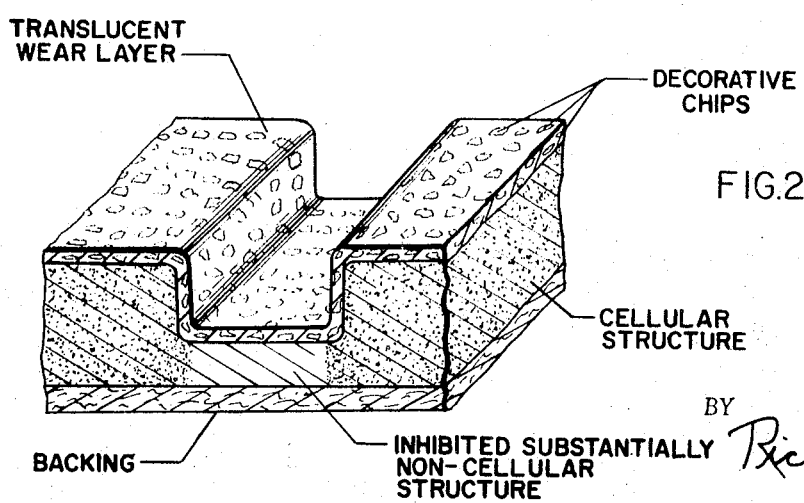

The backing web utilized will depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos and various synthetic fibers. Where loosely woven fabrics such as burlap are used, the fabric can be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

It is sometimes desirable and particularly when the base is a felt sheet to apply a size coat prior to the application of the first coating. The size coat serves as a barrier coat to prevent migration of the felt impregnant into the coat. In addition, the size coat serves to provide good adhesion between the base sheet and the first coat. The size coat is preferably applied as an aqueous emulsion of a suitable resin although it can be applied as a plastisol or the like. Acrylic resins and vinyl chloride polymers have been found particularly useful for this purpose.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well-known in the art.

In accordance with the invention, a foamable resinous polymer composition is applied to the base. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogenous consistency and uniform viscosity and rheological characteristics.

The foamable composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferred since it is unnecessary to remove large volumes of carrier as is necessary with a latex or organosol. The composition can also be a mixture of dry blend and blowing agent. The dry blend is resin particles having plasticizer absorbed on their surface. The dry blend with the addition of stabilizer, pigments and the like can be mixed with the blowing agent and distributed on a base in a smooth layer. The layer is then heated to either form a porous sheet or to fuse partially or completely the composition into a solid sheet. The inhibitor can then be applied to the sheet thus formed in any suitable manner. With the porous sheet modification, the penetration of the inhibitor is simplified because of the porous nature of the sheet. Such sheets are normally thereafter heated and subjected to a pressing operation to densify the sheet.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl bromide, vinyl fluoride, vinyl esters such as vinyl acetate, vinyl chloroacetate, vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics, urea-formaldehydes; cellulose esters; epoxies and silicones.

Resins adaptable for use in formulating vinyl plastisols are commonly referred to as dispersion grade resins. Such resins are available having particle sizes of from about 0.02 to about 2 microns in contrast to calendar grade vinyl resins which are available in particle sizes ranging up to 200 microns. Dispersion grade resins are usually of higher molecular weight than calendar grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective. (ASTM D1243-60.) Specific viscosity is a comparison of the blow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 80 parts plasticizer per 100 parts resin being particularly effective. The viscosity of plastisol compositions can also be reduced by addition of small amounts of a volatile diluent not exceeding about 10 parts per 100 parts resin; it being required that the diluent have no solvating effect on the resin. Useful diluents include benzene, toluene, methyl ethyl ketone, petroleum solvents such as V.M. and P. naphtha (boiling range of 190°–275° F.) and the like.

Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized.

The selection of the plasticizer is important in determining the strength and flexibility of the coating and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol diperlargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of 2 millimeters of mercury or less at 400° F. has been found particularly satisfactory.

Minor amounts of stabilizers are usually incorporated in the coating compositions to reduce the effects of degradation by light and heat. Suitable light stabilizers include phenyl phthalate, phenyl benzoate, o-tolyl benzoate, o-nitrophenol, and organic phosphates and other complexes of such metals as barium, cadmium, calcium, zinc, strontium, lead, tin and the like. Suitable heat stabilizers include sulfides and sulfites of aluminum, silver, calcium, cadmium, magnesium, cerium, sodium, strontium, and the like, leucine, alanine, o- and p-amino benzoic acid and weak acid radicals including ricinoleates and abietates, and the like. Normally, the compositions contain about 0.5 to about 5 parts stabilizer per 100 parts resin. The stabilizer in foamable compositions can exert influence on the decomposition of the blowing agent. Some stabilizers serve as catalyst causing the decomposition to take place at a lower temperature.

The coating compositions can contain pigments in accordance with the particular color desired. Any of the organic and inorganic pigments well known in the art for plastic compositions can be used. Normally, from about 0.5 to about 5 parts pigments per 100 parts resin are used.

The foamable compositions contain, in addition, an effective amount of blowing agent. The larger the amount of blowing agent within practical limits used, the greater is the expansion of the foam. Foam densities of from 12 to about 40 pounds per cubic foot can readily be obtained. Such results are attainable with from about 1 to about 20 parts blowing agent per 100 parts resin. About 2 to 10 parts blowing agent per 100 parts resin is particularly effective for the production of foams of a density which are most desirable for use in producing floor coverings in accordance with the invention.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield an inert gas and have residues which are compatible with the resin are preferred as blowing agents. Such materials have the property of decomposition over a narrow temperature range which is particularly desirable to obtain a good foam structure.

Typical types of blowing agent which can be mentioned include substituted nitroso compounds

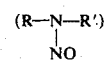

substituted hydrazides (RSO$_2$NHNHR'), substituted azo compounds (R—N=N—R'), acid azides (R—CON$_3$), guanyl compounds

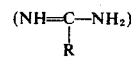

and the like wherein R and R' are hydrogen or hydrocarbon groups usually containing from one to ten carbon atoms.

The blowing agents which have found the most widespread use are those compounds having the >N—N< or —N=N— linkages which decompose at elevated temperatures to yield an inert gas high in nitrogen. These compounds have the general formula

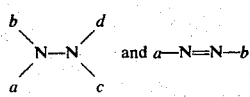

wherein $a$, $b$, $c$, and $d$ are hydrocarbon groups preferably containing up to ten carbon atoms, or hydrogen with at least one of the groups being a hydrocarbon group. Many of these hydrocarbon groups contain additional nitrogen groups such as hydrazide, amido, nitro, nitrile and the like. The presence of such groups is also desirable since they can readily react with the inhibitor to form derivatives having different decomposition temperatures.

Typical blowing agents with their decomposition temperature ranges are shown in Table I:

TABLE I

| Blowing Agent | Decomposition Temperature, °F. |
| --- | --- |
| Azodicarbonamide ($NH_3\overset{O}{\overset{\|}{C}}N=N-\overset{O}{\overset{\|}{C}}-NH_3$) | 325–400 |
| p,p'-oxybis (benzene sulfonyl hydrazide) | 300–340 |
| p,p'-oxybis (benzene sulfonyl semicarbazide) | 390–425 |
| Azobisisobutyronitrile | 215–250 |
| N,N'-dimethyl-N,N'-dinitrosoterephthalamide | 190–220 |
| Diazoaminobenzene | 212–266 |

Additional blowing agents which can be mentioned are N,N'dinitrosopentamethylenetetramine, aminoguanidine bicarbonate, p,p'-thiobis (benzene sulphonhydrazide) p,p'-diphenylmethane disulphonohydrazide, benzene m-disulphonhydrazide, benzene sulphonhydrazide, terephthalazide, benzazide, p-tert.-butyl benzazide, phthalazide, isophthalazide, 1,3-diphenyltriazene, azohexahydrobenzonitrile, azo dicarboxylic acid diethyl ester, naphthalene-1,5-disulfonyl hydrazide and biuret.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing. In some instances, a combination of blowing agents can be used to advantage.

It is common practice to add accelerators or catalysts to the compositions to accelerate the decomposition of the blowing agents, reduce the decomposition temperature and/or narrow the decomposition temperature range. Common accelerators are various metal salts such as dibasic lead phosphite, dibasic lead stearate, dibasic lead phthalate, dibasic lead acetate, basic lead acetate, lead stearate, lead acetate, lead oxide, tribasic lead maleate, tetrabasic lead naphthenate, lead fumarate, lead 2-ethyl hexoate, and similar lead salts, zinc laurate, zinc oxide, zinc stearate, zinc carbonate, zinc 2-ethyl hexoate, zinc di-n-octoate, zinc naphthenate, and similar zinc salts, cadmium octoate, cadmium oxide, cadmium acetate, cadmium naphthenate, cadmium stearate, barium stearate, calcium stearate, nickel stearate, aluminum stearate, magnesium stearate, tin stearate, dibutyl tin maleate, and dibutyl tin oxide. These agents can also serve as stabilizers for the composition. In the specification and claims the term "blowing agent" is intended to include not only the blowing agent or chemical itself, but also the combination of a blowing agent with an accelerator.

The foamable composition is formed into a film of the desired thickness and then heated to gel the composition to give a good printing surface for the application of the inhibitor. In this specification and claims, the term "gel" includes both the partial (at least the elastomeric point) and complete solvation of the resin or resins with the plasticizer (fused). The heating is limited as to the time and temperature to prevent the decomposition of the blowing agent in the composition. When using the preferred polyvinyl chloride composition, the temperature of the composition is preferably raised to about 240° F. to about 275° F. Generally, the actual oven temperature would be a slightly higher temperature. If the foamable composition is to be formed into a self-supporting film, then the temperature would conventionally be high enough to fuse the composition.

The degree of foaming of a typical plastisol formulation using different concentrations of blowing agent is shown in the Table 2:

TABLE 2

| Parts Azodicarbonamide per 100 parts resin | Ratio of foam thickness to original thickness | Density (lbs. per cu. ft.) |
| --- | --- | --- |
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from about 10 to 30 pounds per cubic foot produces the most useful products.

Table 3 gives the preferred temperature and time relationship using the preferred polyvinyl chloride resin:

TABLE 3

| Film condition [1] | Resin temperature (°F.) | Oven temperature (°F.) circulating air | Exposure time (seconds) |
| --- | --- | --- | --- |
| Elastomeric point | 240–300 | 250–400 | 10–200 |
| Fused | 240–375 | 350–450 | 60–240 |
| Blown | 340–400 | 350–450 | 60–240 |

[1] 0.014 inch plastisol on 0.25 inch cellulosic felt base impregnated with 9 percent vinyl acetate and 30 petroleum hydrocarbon. The sample was supported on a wire screen in the oven.

The time required to reach the elastomeric point will depend in part on the film thickness and particular base as shown in Table 4:

TABLE 4

| Base | Film thickness (inch) | Time/temperature (seconds/°F.) |
| --- | --- | --- |
| A [1] | 0.008 | 45/300 |
| A [1] | 0.014 | 69/300 |
| B [2] | 0.014 | 90/300 |

[1] A cellulosic felt of 0.025 inch thickness impregnated with 25 percent vinyl acetate homopolymer.
[2] A cellulosic felt of 0.043 inch thickness containing 5 percent of a cured ureaformaldehyde resin and 25 percent of butadiene-acrylonitrile polymer.

While the foamable composition is described as being applied as a coating to the base, it is apparent that this composition can also be applied as a preformed sheet or the composition can be molded, extruded, calendered or otherwise formed into any desired shape depending on the ultimate use of the product.

The inhibitor for the blowing agent is applied to one surface of the resinous polymer composition in any desired design. The inhibitor is preferably applied in a liquid carrier which allows better control of the concentration of inhibitor applied. If the inhibitor is not soluble in the carrier, it can be dispersed with the carrier in the conventional paint-making technique to produce a fine dispersion. One of the easiest methods of applying the inhibitor-containing composition is by utilizing any of the conventional printing techniques such as silk screen, offset or direct rotogravure printing. As previously indicated, the inhibitor composition can be transparent or pigmented. It is conveniently formulated in the manner of a printing ink. Such compositions usually contain a carrier for the pigment, such as a vinyl resin, and, in some cases, a plasticizer for the resin to give good adhesion to the printing surface. The inhibitor for the blowing agent is an agent which alters the decomposition temperature of the blowing agent in the area of the foamable composition above or below where it is deposited. By varying the concentration of the inhibitor, the thickness of its application or its penetration (solubility or diffusibility) rate into the foamable composition, the degree of suppression or acceleration of the decomposition of the blowing agent can be controlled to produce foam layers of various heights or thicknesses. Unusual design effects can be obtained when the foamable composition is printed with a multicolored design wherein some of the ink compositions contain varying amounts of inhibitor and others do not contain any inhibitor.

The choice of an inhibitor for the blowing agent will depend on a number of factors. The most important are the particular blowing agent utilized in the system, the stabilizer and plasticizer in the composition and the fusion and decomposition temperature of the resin. Since all of these factors play a part, it is important to determine the suitability of any particular system by a simple test. The foamable composition to be tested is coated, or otherwise applied, on a base, heated to gel or partially harden the composition if this can be accomplished without decomposing the blowing agent. Spaced parallel lines of the test ink containing the inhibitor are then applied on the surface of the gelled coating in various concentrations, as for example, 5, 20 and 50 percent of the inhibitor. The sample is then carefully heated to fuse the composition and decompose the blowing agent in the areas desired. The effect of the particular inhibitor with the particular composition and conditions can readily be observed by viewing a cross-sectional cut of the sheet. As a general rule, it is desired to have at least 20° F. difference between the temperature at which the blowing agent will decompose and that at which the inhibited blowing agent will decompose. If a blowing agent is utilized that decomposes below the gel temperature of the composition, the inhibitor can be applied to the base and then the foamable composition applied over the inhibitor. Alternately, the inhibitor can be applied to the surface of the viscous foamable coating prior to heating.

The chemical composition of blowing agents varies widely and, therefore, the type of compound utilized as an inhibitor will vary. As indicated above, a simple test can be carried out to determine the usefulness of any particular compound. Compounds which have been found to be effective as inhibitors to alter the decomposition temperatures for blowing agents which contains the $-N=N-$ or $>N-N<$ linkages are the following groups:

(1) Organic acids, and particularly such as maleic, fumaric, adipic, malic, citric, salicylic, trimellitic, pyromellitic, malonic, 1,2-phthalic, anthranilic, oxalic, formic, furoic, benzoic, 2,6-dihydroxybenzoic, sorbic, levulinic, stearic, myristic, trimesic, oleic, octanoic, o-nitrobenzoic, isosebacic and glutaric, trans-1,2-diamino-cyclohexane tetraacetic acid monohydrate, 4-methoxybenzoic, dihydroxytartaric, o-aminobenzoic, m-aminobenzoic, p-aminobenzoic, 1-naphthoic, terephthalic, dl-mandelic, azelaic, nitrilotriacetic, trichloroacetic, barbituric, 2-pyridinecarboxylic, 2,3-pyridinedicarboxylic, ascorbic acid, and abietic acid. As a general rule, the most useful acids are those having at least two carboxyl groups or those having at least one carboxyl group and one hydroxy group and which contain from 2 to 12 carbon atoms.

(2) Organic acid halides preferably which contain from 2 to 20 carbon atoms and particularly the chlorides such as trimellitic anhydride monoacic chloride, stearoyl chloride, phthaloyl chloride, benzoyl chloride, palmitoyl chloride, cinnamoyl chloride, fumaryl chloride, 1-naphthoyl chloride, terephthaloyl chloride, p-nitrobenzoyl chloride, 4-methoxybenzoyl chloride, isophthaloyl chloride, terephthaloyl chloride, trichloroacetyl chloride, bromoacetyl bromide, chloroacetyl chloride, phenylacetyl chloride, acetyl bromide, n-butyoyl chloride, propionyl chloride, iso-valeryl chloride, n-valeryl chloride, 2-bromopropionyl bromide, dichloroacetyl chloride, oxalyl chloride, lattroyl chloride, myristol chloride, palmitoyl chloride, succinyl chloride, hexanoyl chloride, hydrocinnamoyl chloride, adipyl chloride, iso-butyryl chloride, 4-methyl-n-valeryl chloride, crotonyl chloride, 2-chloropropionyl chloride, 2-phenoxypropionyl chloride, phenoxyacetyl chloride, propionyl bromide, iso-butyryl bromide, n-valeryl bromide, 2-bromo-2-methyl-propionyl bromide, sebacyl chloride, cyclohexanecarbonyl chloride, ethyl oxalyl chloride, 10-undecenoyl chloride, undecanoyl chloride, benzoyl bromide, m-bromobenzoyl bromide, o-chlorobenzoyl chloride, anisoyl chloride, 2-furoyl chloride, 2-naphthoyl chloride, m-bromobenzoyl chloride, 2,4-dichlorobenzoyl chloride, p-phenylazobenzoyl chloride, and 1-intro-2-anthraquinonecarboxyl chloride.

(3) Organic acid anhydrides preferably those containing from 2 to 20 carbon atoms such as maleic, phthalic, succinic, pyromellitic dianhydride, citraconic, pyrotartaric, dodecenyl succinic, trimellitic, tetrahydrophthalic, tetrachlorophthalic, hexahydrophthalic, endo-cis-bicyclo [2.2.1] hept-5-end-2,3-dicarboxylic anhydride, 3,3',4,4'-benzophenone tetracarboxyl dianhydride, 1,2:3,4-cyclopentane-tetracarboxylic acid dianhydride, chlorendic anhydride, dichloromaleic anhydride, acetic anhydride, benzoic anhydride, chloroacetic anhydride, propionic anhydride, n-butyric anhydride, iso-butyric anhydride, n-valeric anhydride, hexanoic anhydride, n-heptanoic anhydride, citraconic anhydride, bicyclo (2,2,1)5-heptene-2,3-dicarboxylic anhydride, cis-4-cyclohexene-1,2-dicarboxylic anhydride, 7-oxabicyclo (2,2,1) heptane-2,3-dicarboxylic anhydride, maleo-pimaric acid anhydride, trifluoroacetic anhydride, pyrotartaric anhydride, glutaric anhydride, dichloroacetic anhydride, itaconic anhydride, 4-methyl-2-cyclohexane-1,2-dicarboxylic anhydride, tetrabromophthalic anhydride-3-nitrophthalic anhydride, tetraiodophthalic anhydride, naphthalic anhydride, 5-norborene-2,3-dicarboxylic anhydride, 3-chlorophthalic anhydride, 4-chlorophthalic anhydride, 4-methylphthalic anhydride, pyromellitic dianhydride.

(4) Polyhydroxy alcohols. The polyhydroxyl aromatic compounds, which form a useful sub-class of alcohols, preferably contain two functional groups, and from 2 to 20 carbon atoms. Representative compounds include p-aminophenol, catechol, resorcinol, hydroquinone, pyrogallol, phloroglucinol, 4-tert-butyl-pyrocatechol, 2,5-ditertiary-butyl hydroquinone, p-benzoquinone, 1,8-dihydroxyanthraquinone, 2,3-naphthalenediol, 2,5-dichloro-3,6-dihydroxy-p-benzoquinone, 2,7-naphthalenediol, 1,3-naphthalenediol, 1,5-naphthalenediol, monotertiary-butyl hydroquinone, alizarin, purpurin, morin, o-hydroxybenzyl alcohol, α-nitroso-β-naphthol, and p-nitrobenzene-azo-α-naphthol. Aliphatic alcohols which can be used preferably contain at least two hydroxy groups and include mannitol, sorbitol, glycerol, ethylene glycol and diethylene glycol.

(5) Carbohydrates, such as d-maltose, d-galactose, d-glucose and fructose.

(6) Nitrogen containing compounds as amines, amides, oximes, and the like, such as ethanolamine, cyclohexylamine, benzylamine, piperazine, p-nitroaniline, acetoacetanilide, N,N'-disalicylidene-1,2-propane diamine, ethylenediamine, triethylenediamine, N,N-diethylaniline, α-benzoin oxime, dimethyl glyoxime, α-furil dioxime, diphenyl carbazone, saliclaldoxime, guanidine carbonate, triethylene tetramine, N-chlorosuccinimide, piperazine, 3,3'-iminobispropylamine, p-phenylene diamine, nicotine, quinine, quinidine, 8-hydroxyquinoline, piperazine, 1,3-dichloro-5,5-dimethylhydrantoin, imidazole, 1,10-phenanthroline monohydrate, p-nitrobenzene-azo-α-naphthol, 1-(2-pyridyl-azo)-2-naphthol, phthalic hydrazide, hydrazobenzene, p-toluene sulfonhydrazide and maleic acid hydrazide. Hexadecyltrimethyl ammonium stearate, hexadecylpyridinium chloride, 1-ethyl quinaldinium iodide. The amine is preferably a primary or secondary aliphatic mono- or polyamine. The aliphatic portion may contain an aromatic or cyclic grouping and be saturated or unsaturated. Cyclic compounds can, for example, have a 6 to 10 member ring and can have from 3 to 12 carbon atoms. Certain of the tertiary aliphatic amines also are useful amines.

(7) Sulphur containing compounds such as thiols or mercaptans, sulfides, sulfones, sulfoxides, sulfonic acids, sulfonyl chloride, sulfonamides, sulfimides and the like, as for example: 2-mercaptobenzothiazole, α,α'-dimercapto-p-xylene, mercaptosuccinic acid, 1-dodecanethiol, methanethiol lead salt, trimethylolpropane tris(3-mercaptopropionate), benzothiazyl disulfide, tetraethylthiuram disulfide, butadiene sulfone, glycol dimercaptoacetate, α-monothioglycerol, tetramethyl thiuram monosulfide, carboxy methylmercaptosuccinic acid, thiodiglycolic acid, tetramethyl thiuram disulfide, ethylene thiourea, thiourea, diphenylthiocarbazone, 1-cysteine, o-benzoic sulfimide, sym-diphenyl-thiourea, α-naphthalene sulfonic acid, 4,4'-biphenyldisulfonic acid, 2-naphthalenesulfonic acid, 1-butanesulfonic acid, m-benzenedifulfonic acid, thioacetamide, p-toluenesulfondichloroamide, 1-ethyl-2-phenyl-2-thiourea, 1,3-diethyl-2-thiourea, 1-phenyl-2-thiourea, 1,1,3,3-tetramethyl-2-thiourea, 2,5-dihydrothiophene-1,1-dioxide, p-toluenesulfonyl chloride, 2-naphthalenesulfonyl chloride, glyoxal sodium bisulfide, sodium dithionite, benzenethiol, 1-butanethiol, p-toluenethiol, 2-naphthalenethiol, ethanethiol, alpha-toluenethiol (benzyl mercaptan), 3-methyl-1-butanethiol, 1-propanethiol, methanethiol, 2-propanethiol, 1-heptanethiol, 2-methylpropanethiol, mercapto-acetic acid (thioglycolic acid), 1-pentanethiol, glutathione, o-toluenethiol, m-toluenethiol, 1,2-ehtanedithiol, o-mercaptobenzoic acid, 2-methyl-2-propanethiol, 2-mercapto-6-nitrobenzothiazole, 6-amino-2-mercaptobenzothiazole, 2-mercaptoethanol, ethyl mercaptoacetate, o-aminobenzenethiol, toluene-3,4-dithiol, 1-hexanethiol, 5-amino-2-benzimidazolethiol, 2-benzoxazolethiol, 3-mercaptopropionic acid, 1-dodecanethiol, 2-mercapto-acetanilide, 2-ethyl-1-hexanethiol, p-chlorobenzenethiol, methyl mercaptoacetate, 2,3-quinoxalinedithio, 2-furanmethanethiol, 2-phenylethanethiol, p-tert-butyl-benzenethiol, 1-octanethiol, 2-(phenylthio) quinoline, ethyl 2-mercaptoethyl carbonate, 4-mercaptobutyric acid, 2,3-dimercaptopropanol, 2,3-dihydroxy-1,4-dithiolbutane, isooctyl 3-mercaptopropionate, isooctyl thioglycolate, 1-thioglycerol, thiomalic acid, methoxymethyl thioglycolate, phenylmercaptoacetic acid, 2,9-para-menthanedithiol, β-mercaptoethyl-3-mercaptocyclohexane, β-mercaptoethyl-4-mercaptocyclohexane, 3-chloropropanethiol-1, pinanyl mercaptan, dithiolterephthalic acid, lauryl thioglycolate, stearyl thioglycolate, lauryl β-mercaptopropionate, stearyl β-mercaptopropionate, hydroxyethyl thioglycolate, hydroxyethyl β-mercaptopropionate, ethylene bis-mercaptoacetate, ethylene bis-β-mercaptopropionate, trimethylolethane, tri-mercaptoacetate, trimethylolpropane tris-mercaptoacetate, pentaerythritol tetrakis-mercaptoacetate, pentaerythritol, tetrakis-β-mercaptopropionate, 31 organotin sulfur, dibutyl tin mercaptopropionate, dibutyl tin bis-(laurylmercaptide), alkyl tin mercaptide, and benzyl thiouronium chloride.

(8) Isocyanates such as 2,4-tolyene diisocyanate, p,p'-diphenylmethane diisocyanate, bitolyene diisocyanate, methylene bis(4-phenyl isocyanate), dianisidine diisocyanate, phenyl isocyanate, 1-naphthyl isocyanate, p-tolyl isocyanate, p-nitrophenyl isocyanate, 2-naphthyl isocyanate, m-tolyl isocyanate, o-tolyl isocyanate, p-ethoxyphenyl isocyanate, p-bromophenyl isocyanate, o-chlorophenyl isocyanate, m-chlorophenyl isocyanate, p-chlorophenyl isocyanate, 2,5-dichlorophenyl isocyanate, o-ethoxyphenyl isocyanate, o-nitrophenyl isocyanate, 2-biphenylyl isocyanate, m-nitrophenyl isocyanate, 4-biphenylyl isocyanate, o-methoxyphenyl isocyanate, p-methoxyphenyl isocyanate, p-methoxyphenyl isocyanate, tolylene-2,4-diisocyanate, m-xylylene diisocyanate, p-xylylene diisocyanate, methylenedi-p-phenyl diisocyanate and p-phenylazophenyl isocyanate.

(9) Ketones and aldehydes such as cyclohexanone, acetylacetone, 1,3-diphenyl-1,3-propanedione, 1-phenyl-1,3-butanedione, glyoxal, preferred compounds within this class will contain two functional groups, i.e., polyketones or polyaldehydes.

(10) Phosphate and phosphite compounds such as n-butyl acid phosphate, diamyl amyl phosphonate, trilauryl trithiophosphite, and phenylneopentyl phosphite.

(11) Other interesting compounds which exert inhibiting qualities are 6,6-dimethyl fulvene, hexachlorocyclopentadiene, 2,4-dinitrophenol, n-hexyl chloroformate, p-nitrobenzyl chloroformate, dibutyl tin maleate and positive chlorine compounds such as dichloroisocyanuric acid, trichloroisocyanuric acid, potassium dichloroisocyanurate, N-chloro-p-benzoquinone imine, dichloroamine, and halane. Some of these latter compounds are contained in the above groups.

When blowing agents are utilized having a reducible bond such as an azo group, a reducing agent is a partricularly effective inhibitor. Typical reducing agents are hydroquinone, polyhydroxyaromatic compounds, phenylenediamines, hydrazobenzenes, alkali metal dithionite, mercaptans such as α,α'-dimercapto-p-xylene and mercaptosuccinic acid, and the reducing sugars.

As indicated previously, some of the inhibitor causes the contacted areas to be raised above the remaining layer by lowering the decomposition temperature of the blowing agent. In some instances, if the foam layer is heated to a higher temperature this increased decomposition can also cause the areas to collapse from being overblown. Such a collapsed product can have substantially the same appearance as if the decomposition of the blowing agent was prevented.

The inhibitors will not be useful for all types of blowing agents. Aminoguanidine bicarbonate is best inhibited with anhydrides such as maleic and trimellitic; N,N'-dimethyl-N,N'-dinitroso-terephthalamide is inhibited by similar anhydrides and chlorides such as terephthaloyl chloride, p,p-oxybis (benzene sulfonyl hydrazide) is inhibited particularly effectively by trimellitic anhydride, terephthaloyl chloride, fumaric acid and hydroquinone. Diazoaminobenzene is inhibited by maleic and trimellitic anhydride and p,p'-oxybis (benzene sulfonyl semicarbazide) is inhibited with maleic and trimellitic anhydride, fumaric acid and terephthaloyl chloride. It is interesting to note that inhibitors such as these catalyze the decomposition of N,N'-dinitrosopentamethylene tetramine resulting in raised areas when these inhibitors are applied. Care must be exercised in selecting the inhibitor to produce the desired results.

The inhibitor produces a differential in the amount of expansion of the contacted areas as compared to the other areas when the heating of the composition is controlled to to permit the differential expansion. This results from a lowering or raising of the decomposition temperature of the contacted blowing agent. The protions of the resinous composition layer on which the inhibitor is applied will be higher or lower, because of this differential decomposition of the blowing agent. The chemical mechanism involved is not known, but it is believed the inhibitor reacts with the functional group or groups on the blowing agent to form a compound or complex having a decomposition temperature different from the blowing agent itself. The acid and acid anhydride are believed to function in this manner. In the use of a reducing agent, the azo group is reduced with hydrogen or a hydrocarbon radical. The inhibitor could also be interfering with the action of the accelerator. It is believed that the metal accelerator will cause the hydrolysis of the amide group in such blowing agent as azobisformamide to form the corresponding salt. The inhibitor may slow down or stop this hydrolysis. Alternately, the inhibitor can function as a catalyst or activator in changing the decompsotion temperature of the blowing agent. Another method is to utilize as the blowing agent in the resinous compsotion a mixture of a blowing agent and an inhibitor or the compound formed by such a combination.

A second inhibitor which will react or interfere with the first inhibitor is applied to the surface of such a composition to cause the first inhibitor to be unavailable to the blowing agent which will revert to its original decomposition temperature. A typical illustration of such a combination would be the use of an acid as one inhibitor and a base as the other inhibitor. The inhibitor can also form a compound with the accelerator utilized to prevent its availability to lower the decomposition temperature of the blowing agent. As an illustration, when using lead as an accelerator, the addition of a chloride ion donor causes the formation of a lead salt which prevents the lead from serving as an accelerator. It has been found that certain chelating agents will chelate metal accelerators and thereby remove them from the system.

It is essential to cause the composition in the areas of application of inhibitor to have a decomposition temperature which is sufficiently different from that of the remaining areas of the composition to allow differential expansion. The fusion temperature of the polymer composition, therefore, fixes the temperature range in which it is necessary to operate to obtain differential decomposition.

The ability of the inhibitor to prevent or accelerate the decomposition of the blowing agents when applied only to the surface of the foamable composition is not understood. The solubility or diffusability of the inhibitor in the foamable composition at the decomposition temperature is a definite factor in the process. When utilizing inhibitors which are readily soluble, the amount of inhibitor and the percentage concentration of inhibitor have a marked effect on the degree of inhibition. The insoluble, or slightly soluble, inhibitors can be finely ground as in the nature of pigment which makes them either readily soluble or diffusible at operating temperatures.

The amount of material utilized in the ink will determine in large measure the degree of foam inhibition. Particularly good results have been obtained with from 5 to about 75 percent of the inhibitor. The efficiency of the system can be improved by placing a barrier coat over the inhibitor, such as an acrylic resin coating, to prevent migration of the inhibitor into the non-foamable wear layer.

The wear layer utilized in this invention is a preformed, self-supporting sheet comprising a thermoplastic resinous material. The thermoplastic resinous binder can be made up solely of thermoplastic resinous material but it normally comprises a mixture of thermoplastic resin and plasticizer.

The resins which may be utilized in the wear layer composition are identical to those previously described as applicable for use in the foamable resinous composition. Polymers of vinyl chloride have been found particularly effective in the formulation of the wear layer. Furthermore, the heat and light stabilizers previously described are also applicable for inclusion in the wear layer compositions.

The wear layer composition also contains fillers and pigments in accordance with the particular background color desired in the finished product. Inert fillers such as silica, both amorphous and crystalline, whiting, talc, clay, pumice, limestone and the like are suitable. Pigments are selected in accordance with the desired color. For example, where a white background is desired, titanium dioxide and zinc oxide either alone or with extenders such as barium sulfate, magnesium carbonate, magnesium silicate and the like can be used. For colored backgrounds, any of the well-known organic or inorganic pigments can be used.

It has been found that the presence of filler is virtually essential to the invention in order to prevent shrinkage and deformation of the wear layer. The amount of filler required will vary with the type of filler but best results have been obtained when the filler is present in at least 25 percent by weight of the composition and not over 60 percent of the composition. Inasmuch as in the preferred embodiment of the invention, the inhibitor is applied to the surface of the foamable composition with a printed design and such printed design is visible when viewed through the wear layer, it is essential for the filler to be transparent or translucent. Platy talc is a particularly good filler of this type.

The wear layer is produced by preparing granules, chips, flakes or the like of resinous composition material containing the required filler, coating the flakes with a plastisol and then calendering the mixture into a sheet without fusing the plastisol. The chips of composition are preferably multicolored. Multicolored chips of resinous composition can be conveniently prepared by mixing separate batches of different colored resinous compositions which are thereafter granulated and the granules admixed in the desired proportions to give the wanted color combination. The mixed granules are then sheeted by any suitable means, such as by passage through calender rolls or extruding, and the sheets thus produced converted into the desired geometric shapes. It is preferred that the thickness of the chips, granules or the like be substantially uniform, and, therefore, cutting them from a sheet is highly advantageous. The thickness of the chips are preferably from about one-third to about seven-eighths of the thickness of the decorative wear surface layer to be produced and a chip thickness in the range of about one-half to about three-fourths is particularly effective. The thickness of the wear layer can vary but the minimum thickness is 0.014 inch. As a general rule, the maximum thickness for wear layer of general utilization is 0.050 inch. In addition, the size of the pigmented composition chips is of particular importance to obtain the desired decorative effect. The preferred range in face area is from about 0.05 inch in diameter to about 0.5 inch in diameter.

The chips are then coated with a liquid resinous composition. Particularly desirable results have been obtained with a blend which contains about 25 percent to about 50 percent liquid composition and about 75 percent to about 50 percent chips by weight. A range of about 30 percent to about 40 percent liquid composition and about 70 percent to about 60 percent chips has been found particularly effective.

In accordance with one embodiment of the invention, the initial preparation of the foamable resinous composition may be accomplished by applying a layer of a resinous polymer composition containing a blowing agent to a base, heating the coating to at least partially gel the composition without decomposing the blowing agent to yield a relatively solid surface, and printing or otherwise applying on the surface of the gelled sheet a composition containing an inhibitor which will alter the decomposition temperature of the blowing agent within the composition.

As an alternate method, the foam inhibiting agent can be printed or otherwise applied to a supporting base and then the foamable composition applied over the inhibiting agent. The base in this instance can be, if desired, a transfer sheet and the design applied to form a decalcomania. Additionally, the foamable composition can be formed into a fused or partially fused sheet without decomposing the blowing agent, such as by calendering, and then the inhibitor applied to either surface of the sheet. As another alternate method, a non-foaming solid resinous polymer composition can be applied over the foamable composition and the inhibitor applied on the surface of the solid composition. During heating, the inhibitor will migrate through the composition which does not contain a blowing agent into the foamable layer. As is apparent in such a system, the concentration of applied inhibitor would have to be greater than if applied directly to the foamable composition to obtain the same degree of embossing.

With regard to the application of the wear layer, this second stage of the process of this invention may be accomplished in a variety of ways. Thus, the resinous composition sheet may be applied directly to the inhibitor-containing composition, with or without an adhesive layer. Alternately the printed foamable layer can be heated so that it is particularly tacky and then the wear layer brought into contact with the layer.

The preferred method, however, is by laminating the wear layer sheet to the foamable resinous composition at the time of formation of the wear layer. Thus, the viscous mass comprising the pigmented chips and the resinous composition is fed to a pair of calender rolls. The distance between the calender rolls is preferably adjusted so that it is greater than the thickness of of the chips. In this manner, the viscous composition can be formed into a sheet without substantially distorting the size and shape of the chips. The calender rolls are so heated as to cause partial solvation of the resin thereby converting the liquid mass into a solid, self-supporting sheet containing the chips. The contact time of the composition with the heated calender rolls is of critical importance in that sufficient heat has to be added to the composition to cause the conversion of the liquid to a gelled solid sheet. The heated sheet is then laminated to the printed foamable layer.

The critical property of the resinous wear layer, for purposes of the invention, is its fluidity or viscosity at the range of temperatures utilized to decompose the blowing agent. This condition is obtained by calendering or otherwise forming the composition into a sheet at a temperature below the fusion temperature of the composition. This can be accomplished for example when utilizing the preformed polyvinyl chloride composition by passage through roll heated at approximately 225° F. to 300° F.

The multi-layered assembly comprising the foamable resinous composition, the inhibitor and the translucent wear layer is then heated to a temperature sufficient to fuse both resinous compositions by completely solvating the resin with plasticizer and to decompose the blowing system. The temperature of the entire mass of composition upon the backing must attain the fusion temperature of the resin in order to obtain a product of maximum strength and stain resistance. Using the preferred vinyl resin, fusion is attained at a temperature of about 325° F. to about 375° F. In addition, the entire mass of foamable composition must be heated to a point where the blowing agent is decomposed. When the preferred high temperature blowing agent is used, foaming does not occur until the resinous composition has been fused. The heating must be carried out, however, at a temperature which allows decomposition of the blowing agent only in the areas desired. The heating also enables the wear layer to assume the desired fluidity so that it may conform to the embossings developing on the surface of the resinous composition.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if a hydrocarbon solvent fraction (boiling point up to 350° F.) is used, heating at 200° F. - 250° F. for 5 minutes will remove sufficient material so that fusion and blowing at 400° F. can be accomplished with good cell structure and freedom from blisters. Heating in order to effect fusion and foaming can be brought about in a forced hot air oven; however, other types of heating can be used. For example, the product can be passed beneath radiant heating elements; alternately, dielectric heating can be used.

The foamed and fused product after leaving the heating oven is permitted to cool. Cooling is particularly important since any premature handling of the product immediately after foaming might cause partial collapse and distortion of the foam structure. Cooling can be brought about by mere exposure of the product to the atmosphere; thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls.

After being cooled, the product is withdrawn from the processing apparatus. It can be used in the form of a sheet as produced or can be cut into tiles or other appropriate shaped depending on the particular use to which the product is to be put. Products produced in accordance with the invention have the characteristics of excellent resilience, depending in part on the thickness of the foam layer. They are also characterized by having a marked three-dimensional textured appearance in perfect register with a printed design, if desired. Still further, the products of the invention have good heat insulating properties by virtue of the layer of foamed composition and thus are warmer in winter than conventional resinous surface coverings.

In addition, the products exhibit excellent wear resistance, chemical resistance and stain resistance as a result of the presence of a translucent, decorative wear layer over the entire surface thereof. The wear layer is observed to have penetrated every crevice of the embossed pattern.

The following examples will further illustrate the embodiment of this invention. In these examples, all parts given are by weight unless otherwise noted.

EXAMPLE I

This example illustrates the preparation of a wear resistant, embossed, resinous composition typical of the products of this invention.

Preparation of Foamable Resinous Composition

A 0.035 inch thick asbestos sheet backing was coated, in a wet thickness of 0.015 inch, with the following foamable plastisol:

| | Parts |
|---|---|
| Polyvinyl chloride (low molecular weight) | 50 |
| Polyvinyl chloride (high molecular weight) | 50 |
| Dibasic lead phosphate | 1.5 |
| Azodicarbonamide | 2.5 |
| Titanium dioxide | 5 |
| Butyl benzoyl phthalate | 55 |
| Dodecyl benzene | 10 |

Gelling of the foamable plastisol was accomplished by heating the coating for a period of 2½ minutes in a 400° F. oven.

Thereafter, the following embossing ink was applied to sections of the gelled plastisol by means of a rotogravure printing technique:

| | Parts |
|---|---|
| Fumaric acid | 10 |
| Vinyl chloride—vinyl acetate copolymer | 7.5 |
| Methyl ethyl ketone | 47.5 |
| Titanium dioxide | 14.0 |

PREPARATION OF WEAR LAYER

The following plastisol composition was formulated by thoroughly mixing the ingredients listed hereinbelow:

|  | Parts |
| --- | --- |
| Dioctyl phthalate plasticizer) | 99 |
| Butyl benzoyl phthalate | 16 |
| Stabilizer | 19.2 |
| Polyvinyl chloride and dioctyl phthalate plastisol | 48 |
| Dispersion grade polyvinyl chloride | 320 |
| Stearic acid (lubricant) | 1.3 |

The translucent flakes which were used in conjunction with the above described plastisol composition in the preparation of the wear layer were prepared from the following formulation:

|  | Parts |
| --- | --- |
| Polyvinyl chloride | 100 |
| Platy talc (filler) | 50 |
| Dioctyl phthalate (plasticizer) | 32.5 |
| Butyl benzoyl phthalate | 4.5 |
| Stabilizer | 7.5 |
| U.V. light absorbent | 0.4 |
| Pigment | 6.0 |

The flake stock was formed into a translucent, 0.015 inch thick sheet which was then comminuted into square flakes of approximately 0.125 inch in maximum dimension.

The resulting translucent flakes were uniformly blended in the proportion of 35 percent, by weight, of clear plastisol to 65 percent, by weight, of flakes. The blend while at a temperature of about 70° F. was fed to two chromeplated calender rolls. The top calender roll was heated to 290° F. and the bottom calender roll was heated to 270° F. The calender rolls were spaced apart to produce a sheet of about 0.030 inch in thickness. The sheet was allowed to remain in contact with the bottom roll for almost a complete revolution and thereafter stripped from the roll. The rate of sheet production from the bottom roll was 19 feet per minute.

LAMINATION AND EMBOSSING PROCEDURES

The 0.030 inch calendered wear layer was then laminated to the foamable plastisol composition by passing both sheets to a laminator at a speed of 30 feet per minute, such that the ink printed surface of the foamable composition was in intimate, face-to-face contact with the wear layer. The two sheets were subjected to a drum temperature of 340° F. and a roll pressure of 575 psig. during the lamination procedure. It was thus the combination of heat, pressure and the adhesive qualities of the vinyl embossing ink that enabled the two sheets to form a uniform, thoroughly adhered laminate.

The resulting laminate was then passed, at a speed of 30 feet per minute, into an oven having four zones each of 30 feet in length. The zones were heated to 300° F., 300° F., 405° F., and 400° F., respectively. During the heating operation, the laminate became fused and the blowing agent decomposed to form elevated cellular sections of the surface of the product. The product had a textured surface with the ratio of foam thickness to original thickness being 3:1, the raised areas representing those sections which were not printed with the inhibitor-containing embossing ink.

In addition, the wear layer had totally conformed to the embossings on the surface of the product. It provided the product with excellent resistance to wear, staining and chemical attack. Furthermore, the surface decoration of the product was particularly unique and attractive in view of the precise retention of the desired embossed design and the combination of the wear layer and the pigmented flakes.

Additional wear resistant, multi-layered resinous assemblies exhibiting properties which are comparable to those of the assembly prepared hereinabove, may be prepared by utilizing any of the foamable plastisol compositions and inhibitor-containing printing composition disclosed in U.S. Pat. No. 3,293,108 in conjunction with any of the wear layer compositions disclosed in U.S. Pat. No. 3,194,859, and said disclosures are to be deemed fully incorporated herein.

Summarizing, it is thus seen that this invention provides for the preparation of novel wear resistant, embossed resinous compositions. Variations may be made in proportions, procedures and materials without departing from the scope of this invention which is defined by the following claims:

We claim:

1. In the process for producing a wear resistant, multilayered resinous assembly on a base, the surface of said assembly having areas of contrasting thicknesses, said process comprising the steps of: (1) incorporating a blowing agent into a resinous material; (2) forming said resinous material into a layer; (3) applying to portions of said layer an inhibitor for said blowing agent which is capable of penetrating into said resinous material and altering the decomposition temperature of said blowing agent; (4) applying a wear layer thereto; and (5) heating the resulting assembly to the decomposition temperature of said blowing agent;

the improvement which comprises applying as the upper surface of said multi-layered assembly a preformed, self-supporting, non-fused, translucent wear layer having a thickness of from about 0.014 inch to 0.050 inch and comprising a blend of from about 25 to 50 percent, by weight, of a resinous composition with from about 75 to 50 percent, by weight, of thermoplastic decorative chips encompassed therein, and heating the resulting assembly to effect the inhibition reaction and, thereafter, to decompose the blowing agent and fuse the resinous compositions so as to effect expansion at the sites of decomposition and the formation of the contrasting thicknesses on the surface thereof, said wear layer exhibiting sufficient fluidity during said heating to strictly conform to the resulting contrasting surface thicknesses.

2. The process of claim 1, wherein said resinous material is a polymer of vinyl chloride.

3. The process of claim 1, wherein said blowing agent is selected from the group consisting of substituted nitroso compounds, substituted hydrazides, substituted azo compounds, acid azides and guanyl compounds.

4. The process of claim 3, wherein said blowing agent decomposes above about 200° F.

5. The process of claim 4, wherein said blowing agent is azodicarbonamide.

6. The process of claim 3, wherein said blowing agent contains an accelerator therefor.

7. The process of claim 1, wherein said inhibitor is selected from the group consisting of organic acids, organic acid anhydrides, organic acid halides, polyhydroxy alcohols, amines, amides, oxines, mercaptans, sulfides, sulfones, sulfoxides, sulfonic acids, sulfonyl halides, sulfonamides, sulfimides and isocyanates.

8. The process of claim 7, wherein said inhibitor is fumaric acid.

9. The process of claim 7, wherein said inhibitor is at least partially soluble in at least one component of said resinous material below the decomposition temperature of said blowing agent.

10. The process of claim 1, wherein said resinous material is heated in order to at least partially fuse the resinous material prior to the application of said inhibitor and the decomposition of said blowing agent.

11. The process of claim 9, wherein said inhibitor is applied to portions of a base and said resinous material containing said blowing agent is applied over said inhibitor and base prior to said blowing agent.

12. The process of 1, wherein said inhibitor is applied to said resinous material in a printing composition.

13. The process of claim 12, wherein said inhibitor is applied to said resinous material in the form of a design by a rotogravure printing process.

14. The process of claim 1, wherein the resinous composition in said wear layer comprises a mixture of a thermoplastic resin and a plasticizer.

15. The process of claim 14, wherein said thermoplastic resin is a polymer of vinyl chloride.

16. The process of claim 1, wherein said wear layer contains an inert filler in a concentration ranging from about 25 – 60 percent, by weight.

17. The process of claim 1, wherein said decorative chips comprise pigmented, plasticized vinyl chloride polymer compositions.

18. The process of claim 17, wherein said decorative chips have a thickness of from about one-third to seven-eighths of the thickness of said wear layer and a diameter of from about 0.05 to 0.50 inch.

19. The process of claim 1, wherein said base is asbestos sheeting.

20. In the process for producing a wear resistant, multilayered resinous assembly on a base, the surface of said assembly having areas of contrasting thicknesses, said process comprising the steps of: (1) incorporating azodicarbonamide into a plasticized vinyl chloride polymer composition: (2) forming the resulting polymer composition into a layer; (3) applying fumaric acid to portions of said layer, said fumaric acid being capable of penetrating into said polymer composition and altering the decomposition temperature of said azodicarbonamide; (4) applying a wear layer thereto; and (5) heating the resulting assembly to the decomposition temperature of said azodicarbonamide;

the improvement which comprises applying as the upper surface of said multi-layered assembly a preformed, self-supporting, non-fused, translucent wear layer having a thickness of from about 0.014 inch to 0.050 inch and comprising a gelled, vinyl chloride polymer plastisol composition containing plasticized vinyl chloride polymer decorative chips encompassed therein, said plastisol composition being present in said wear layer in a concentration of from about 25 – 50 percent, by weight, and said decorative chips being present in a concentration of from about 75 – 50 percent, by weight, said chips having a thickness of from about one-third to seven-eighths of the thickness of the final wear layer; and, heating the assembly to effect the azodicarbonamidefumaric acid inhibition reaction and, thereafter, to decompose the azodicarbonamide and fuse the vinyl chloride polymer compositions so as to effect expansion at the sites of decomposition and the formation of the contrasting thicknesses on the surface thereof, said wear layer exhibiting sufficient fluidity during said heating to strictly conform to the resulting contrasting surface thickness.

* * * * *